(12) United States Patent
Nakajima (10) Patent No.: US 8,665,222 B2
(45) Date of Patent: Mar. 4, 2014

(54) HANDWRITING-INPUT DEVICE AND METHOD

(75) Inventor: Kenji Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1296 days.

(21) Appl. No.: 11/098,394

(22) Filed: Apr. 5, 2005

(65) Prior Publication Data

US 2005/0237311 A1    Oct. 27, 2005

Related U.S. Application Data

(63) Continuation of application No. PCT/JP03/00868, filed on Jan. 30, 2003.

(51) Int. Cl.
*G06F 3/041* (2006.01)

(52) U.S. Cl.
USPC .............. 345/173; 178/18.01; 178/19.01; 382/186

(58) Field of Classification Search
USPC ............... 345/173–178; 178/18.01–18.11; 382/186
See application file for complete search history.

(56) References Cited

U.S. PATENT DOCUMENTS

| | | | |
|---|---|---|---|
| 5,361,310 A | | 11/1994 | Ishigaki |
| 5,528,743 A | * | 6/1996 | Tou et al. ............... 715/234 |
| 5,553,225 A | * | 9/1996 | Perry ..................... 715/786 |
| 5,596,350 A | * | 1/1997 | Capps et al. ............ 345/173 |
| 5,682,439 A | | 10/1997 | Beernink et al. |
| 5,698,822 A | | 12/1997 | Haneda et al. |
| 5,850,477 A | | 12/1998 | Takada |
| 5,913,221 A | | 6/1999 | Kano et al. |
| 5,914,718 A | | 6/1999 | Chiu et al. |
| 6,097,392 A | | 8/2000 | Leyerle |
| 6,429,856 B1 | * | 8/2002 | Omura et al. ............ 345/175 |
| 6,525,749 B1 | | 2/2003 | Moran et al. |
| 2002/0056575 A1 | | 5/2002 | Keely et al. |

FOREIGN PATENT DOCUMENTS

| | | |
|---|---|---|
| JP | 6124164 | 5/1994 |
| JP | 1994-180631 | 6/1994 |
| JP | 6-208654 | 7/1994 |
| JP | 1995-210305 | 8/1995 |
| JP | 8-6707 | 1/1996 |
| JP | 8-185266 | 7/1996 |

(Continued)

OTHER PUBLICATIONS

Supplementary European Search Report issued in corresponding European Patent Application No. 03815583.4, on Nov. 2, 2007.

(Continued)

*Primary Examiner* — Michael Pervan
(74) *Attorney, Agent, or Firm* — Fujitsu Patent Center (57) ABSTRACT

A handwriting-input device and method capable of inputting a mixture of a character and a graphic without feeling discomfort even when an input area is physically limited. A handwriting-input device including, on a display screen, a normalized pencraft input area for inputting a pencraft desired to be normalized to be input and a pencraft arrangement area for inputting a pencraft that is not normalized and normalizing the pencraft to display it, at least includes: coordinate input means to obtain coordinate position information input by an input medium; and input area judgment means to judge which of the normalized pencraft input area and the pencraft arrangement area the pencraft is input in, based on the coordinate position information, wherein the pencraft can be input based on a judgment result in the input area judgment means.

8 Claims, 9 Drawing Sheets

(56) References Cited

FOREIGN PATENT DOCUMENTS

| | | |
|---|---|---|
| JP | 8-315167 | 11/1996 |
| JP | 1997-204288 | 8/1997 |
| JP | 9-319504 | 12/1997 |
| JP | 1997-319504 | 12/1997 |
| JP | 10-91346 | 4/1998 |
| JP | 2939119 | 6/1999 |

OTHER PUBLICATIONS

Japanese Patent Office Action, mailed Apr. 17, 2008 and issued in corresponding Japanese Patent Application No. 2004-567526.

* cited by examiner

HANDWRITING-INPUT DEVICE AND METHOD

This application is a continuation application, filed under 35 U.S.C. §111(a), of International Application PCT/JP2003/000868, filed Jan. 30, 2003, the entire contents of which are incorporated herein by reference.

TECHNICAL FIELD

The present invention relates to a handwriting-input device and method for inputting a pencraft such as a character, a graphic, or the like using coordinate input means at a portable terminal with a narrow display area.

BACKGROUND ART

Along with the recent miniaturization and increased speed of a CPU, and the enhancement of a screen display speed and precision in a small and light-weight display apparatus such as a liquid crystal display apparatus, portable terminals such as a mobile telephone and a personal digital assistant (PDA) are also being miniaturized and reduced in weight. In such a small portable terminal and the like, it is physically difficult to provide an input interface such as a keyboard, and there is a limit to the reduction in input time in a thumb-input interface as in a mobile telephone, so that an input interface for inputting a handwritten character and a handwritten graphic is often provided.

However, generally in a small portable terminal and the like, a display screen is usually very small due to the physical constraint thereof. In the case of inputting a handwritten character or graphic on such a small display screen, a display area in which the character or graphic is to be input is not necessarily large enough, and there is also a limit to the increase in resolution of a display screen due to the physical constraint of the display area.

In order to solve the above-mentioned problem, various handwriting-input methods have been proposed. For example, JP2939119 discloses a handwriting-input method in which an input mode and a display mode are switched based on the behavior of a pen in an input display area. According to this method, a relatively large input display area is kept by scrolling or the like, and thereafter, a handwritten character or the like is input in the input mode. Then, the input mode is switched to the display mode, and stroke data on the input handwritten character or the like is normalized so as to be matched with the position and size specified in the display area, whereby the handwritten character or the like can be input at a desired position. The method for normalizing an input handwritten character is disclosed in detail by JP3268029, JP10(1998)-91346A, and the like. By switching a mode as described above, a sufficient area for input can be kept at a time of an input, and a display with an appropriate size can be performed at a time of a display. Thus, the physical constraint of the display screen can be eliminated.

Furthermore, JP8(1996)-185266A discloses a method for adjusting the variation of characters at a time of a display, while allowing stroke data and a bit image to be mixed. JP6(1994)-124164A discloses a method for inputting a pencraft on a screen enlarged by a predetermined magnification at a time of a handwriting-input, and displaying the input pencraft with a reduced size corresponding to a display screen at a time of viewing. In any method, a pencraft is input in a relatively large area at a time of an input, and a displayed pencraft is normalized in accordance with the constraint of a display area, whereby the physical constraint of a display screen is eliminated.

According to the above-mentioned method, an input pencraft is reduced in size, so that even when a display area is small, a relatively large number of pencrafts can be written. However, it is required to previously specify writing positions of the pencrafts. Furthermore, even a pencraft input as a graphic is considered as a character, and normalized to a predetermined size, so that a graphic cannot be input. Thus, in the case where it is necessary to input a mixture of a character and a graphic, a user needs to input a pencraft consciously by specifying an input mode regarding whether a character or a graphic is to be input next. Thus, there is a problem that a so-called free handwriting memorandum cannot be realized.

Furthermore, there is a time lag from a time when a pencraft is input in an input area to a time when the input pencraft is displayed in a display area. Therefore, in some cases, the user has to be in a stand-by state until the pencraft is input at a predetermined position.

Furthermore, although a pencraft can be written on an enlarged input screen at a time of an input, since a display area is enlarged, the area where a pencraft can be actually input is relatively narrow. Therefore, in order to input a number of characters, an unwritten input area needs to be displayed by scrolling or the like frequently, which makes an operation itself cumbersome.

DISCLOSURE OF INVENTION

The present invention has been achieved in order to solve the above-mentioned problems, and its object is to provide a handwriting-input device and method capable of inputting a mixture of a character and a graphic without feeling discomfort even when an input area is physically limited.

In order to achieve the above-mentioned object, a handwriting-input device according to the present invention including, on a display screen, a normalized pencraft input area for inputting a pencraft desired to be normalized to be input and a pencraft arrangement area for inputting a pencraft that is not normalized and normalizing the pencraft to display it, at least includes: coordinate input means to obtain coordinate position information input by an input medium; and input area judgment means to judge which of the normalized pencraft input area and the pencraft arrangement area the pencraft is to be input in, based on the coordinate position information, wherein the pencraft can be input based on a judgment result in the input area judgment means.

According to the above-mentioned configuration, whether a pencraft desired to be normalized is input or a pencraft that is not desired to be normalized is input can be controlled in accordance with the operation situation of an input medium such as a pen. Thus, a handwriting-input can be performed in accordance with the intention of a user without requiring the user to consciously switch between a normalized pencraft input mode and a non-normalized pencraft input mode.

Furthermore, in the handwriting-input device according to the present invention, it is preferable that, in a case where it is judged by the input area judgment means that the pencraft is to be input in the pencraft arrangement area and that there is no input in the normalized pencraft input area, the pencraft is input directly to be displayed at a designated position of the pencraft arrangement area.

Furthermore, in the handwriting-input device according to the present invention, it is preferable that, in a case where it is judged by the input area judgment means that the pencraft is to be input in the pencraft arrangement area and that there is input in the normalized pencraft input area, the pencraft input in the normalized pencraft input area is normalized to be displayed at the designated position of the pencraft arrangement area.

Furthermore, in the handwriting-input device according to the present invention, it is preferable that, by the coordinate input means, continuous coordinate position information due to a drag operation is obtained; by the input area judgment means, a coordinate position corresponding to a start position of the continuous coordinate position information and a coordinate position corresponding to an end position are detected, and it is judged in which area the coordinate position corresponding to the start position and the coordinate position corresponding to the end position are respectively present; and based on a judgment result by the input area judgment means, the pencraft present at the coordinate position corresponding to the start position can be moved to the coordinate position corresponding to the end position.

Furthermore, in the handwriting-input device according to the present invention, it is preferable that an area ratio between the normalized pencraft input area and the pencraft arrangement area is specified, and a display area ratio between the normalized pencraft input area and the pencraft arrangement area is varied depending upon the specified area ratio. This is because it becomes easy to input a handwritten character in accordance with a situation.

Furthermore, in the handwriting-input device according to the present invention, it is preferable that a horizontal scroll area is provided between the normalized pencraft input area and the pencraft arrangement area, and the normalized pencraft input area can be enlarged or reduced in size by the horizontal scroll area. This is because the length of a sentence to be input can be handled flexibly.

Furthermore, the present invention is characterized by software for executing the function of the above-mentioned handwriting-input device as processing steps of a computer. More specifically, the present invention is characterized by a computer-executable program for embodying a handwriting-input method in a handwriting-input device including, on a display screen, a normalized pencraft input area for inputting a pencraft desired to be normalized to be input and a pencraft arrangement area for inputting a pencraft that is not normalized and normalizing the pencraft to display it, at least inducing the steps of: obtaining coordinate position information input by an input medium; and judging which of the normalized pencraft input area and the pencraft arrangement area the pencraft is to be input in, based on the coordinate position information, wherein the pencraft can be input based on a judgment result regarding which of the normalized pencraft input area and the pencraft arrangement area the pencraft is input, and for embodying such steps.

According to the above-mentioned configuration, by loading the program onto a computer for execution, whether a pencraft desired to be normalized is input or a pencraft that is not desired to be normalized is input can be controlled in accordance with the operation situation of an input medium such as a pen. Thus, a handwriting-input device can be realized, which is capable of performing a handwriting-input in accordance with the intention of a user without requiring the user to consciously switch between a normalized pencraft input mode and a non-normalized pencraft input mode.

BEST MODE FOR CARRYING OUT THE INVENTION

Embodiment 1

Figure 1:
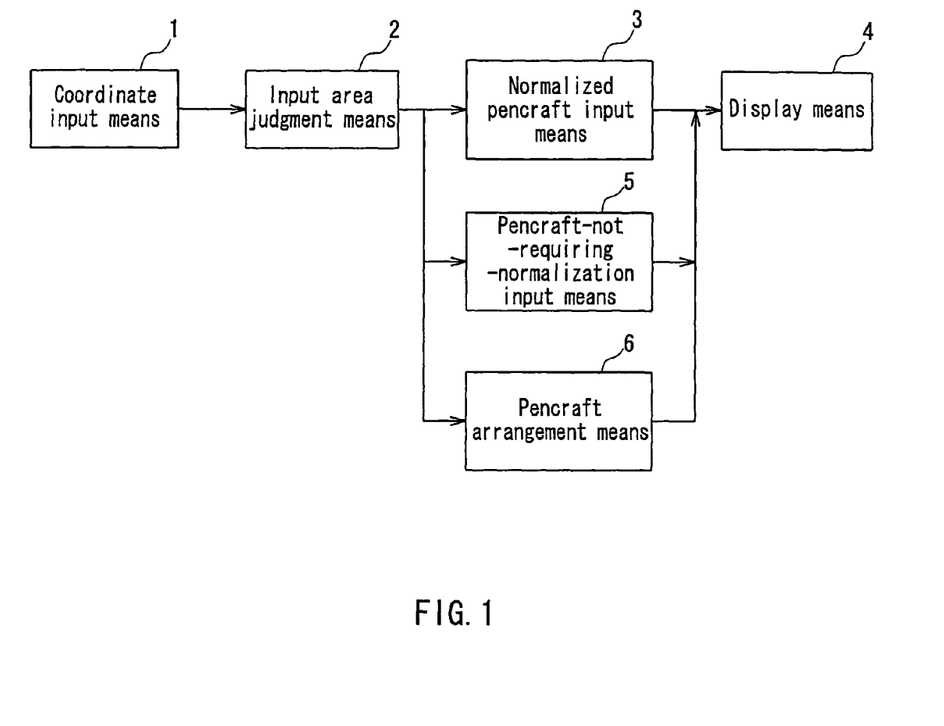
FIG. 1 is a diagram showing a configuration of a handwriting-input device according an embodiment of the present invention.

Hereinafter, the handwriting-input device according to Embodiment 1 of the present invention will be described with reference to the drawings. FIG. 1 is a diagram showing a configuration of the handwriting-input device according to Embodiment 1 of the present invention.

In FIG. 1, reference numeral 1 denotes coordinate input means to input a coordinate of a position at which an input medium such as a pen taps in a screen display area in which a user can input a pencraft. Herein, the term "tap" refers to that the input medium touches a display screen.

As the screen display area in which a user can input a pencraft, a normalized pencraft input area 21 and a pencraft arrangement area 22 are considered. In the normalized pencraft input area 21, a pencraft desired to be normalized can be input. In the pencraft arrangement area 22, the pencraft input in the normalized pencraft input area 21 is normalized to be arranged, and a pencraft that is not required to be normalized can be input.

Furthermore, reference numeral 2 denotes input area judgment means to judge which area of the above-mentioned normalized pencraft input area 21 and the pencraft arrangement area 22 the coordinate position input from the coordinate input means 1 corresponds to. Then, based on the area in which the input coordinate is positioned and the other conditions, the kind of an operation by an input medium such as a pen is specified. As the other conditions, whether or not there is a character input in the normalized pencraft input area 21, whether or not there is a character or a graphic that has already been arranged at a coordinate position in the pencraft arrangement area 22, and the like are considered.

First, in the case where the input coordinate position is in the normalized pencraft input area 21, it is judged that an input operation of a pencraft desired to be normalized is to be performed, and a pencraft to be normalized is input in the normalized pencraft input area 21 by normalized pencraft input means 3. The input pencraft is displayed in the normalized pencraft input area 21 by display means 4.

Next, in the case where the input coordinate position is in the pencraft arrangement area 22, there is no pencraft input in the normalized pencraft input area 21, and there is no pencraft that has already been input at the input coordinate position, it is judged that an operation of inputting a pencraft that is not required to be newly normalized is to be performed, and a pencraft is input as pencraft data that is not required to be normalized by pencraft-not-requiring-normalization input means 5. Even in this case, the input pencraft is displayed in the pencraft arrangement area 22 by the display means 4.

Furthermore, in the case where the input coordinate position is in the pencraft arrangement area 22, and there is a pencraft input in the normalized pencraft input area 21, it is judged that an operation of arranging the input pencraft in the pencraft arrangement area 22 is to be performed, and the pencraft input in the normalized pencraft input area 21 is normalized to a predetermined size to be arranged in the pencraft arrangement area 22 by pencraft arrangement means 6. More specifically, when the input medium such as a pen is moved to the pencraft arrangement area 22 after a series of pencrafts are input in the normalized pencraft input area 21, and a display screen is tapped again, the input pencrafts are normalized to a size appropriate for a display and displayed at the tapped position. In this case, the pencrafts arranged in the pencraft arrangement area 22 are displayed by the display means 4.

Furthermore, in the case where the tapped coordinate position is in the pencraft arrangement area 22, there is no pencraft input in the normalized pencraft input area 21, and there is a pencraft that has already been arranged at the input coordinate position, it is judged that an operation of rearranging the pencraft that has already been arranged in the pencraft arrangement area 22 is to be performed, and the pencraft that has already been arranged is moved to a desired position by an operation of dragging the pencraft or the like in the pencraft arrangement means 6. More specifically, in the case where the pencraft that has already been arranged in the pencraft arrangement area 22 is tapped and dragged, it is judged by the input area judgment means 2 that an operation of rearranging is to be performed, and a specified pencraft is moved following the drag of the pen.

In the case where the specified position after movement is in the normalized pencraft input area 21 in the above-mentioned operation of rearrangement, it is judged by the input area judgment means 2 that an edition operation of adding a content or the like to the pencraft selected by tapping is to be performed, and the pencraft that has been in the pencraft arrangement area 22 is transferred to the normalized pencraft input area 21. This enables edition to be performed easily.

As described above, by performing handwriting-input processing while determining whether a pencraft normalized is input or a pencraft that is not required to be normalized is input in accordance with the operation situation of the input medium such as a pen, a handwriting-input can be performed in accordance with the intention of a user without requiring the user to consciously switch between a normalized pencraft input mode and a non-normalized pencraft input mode.

Figure 2:
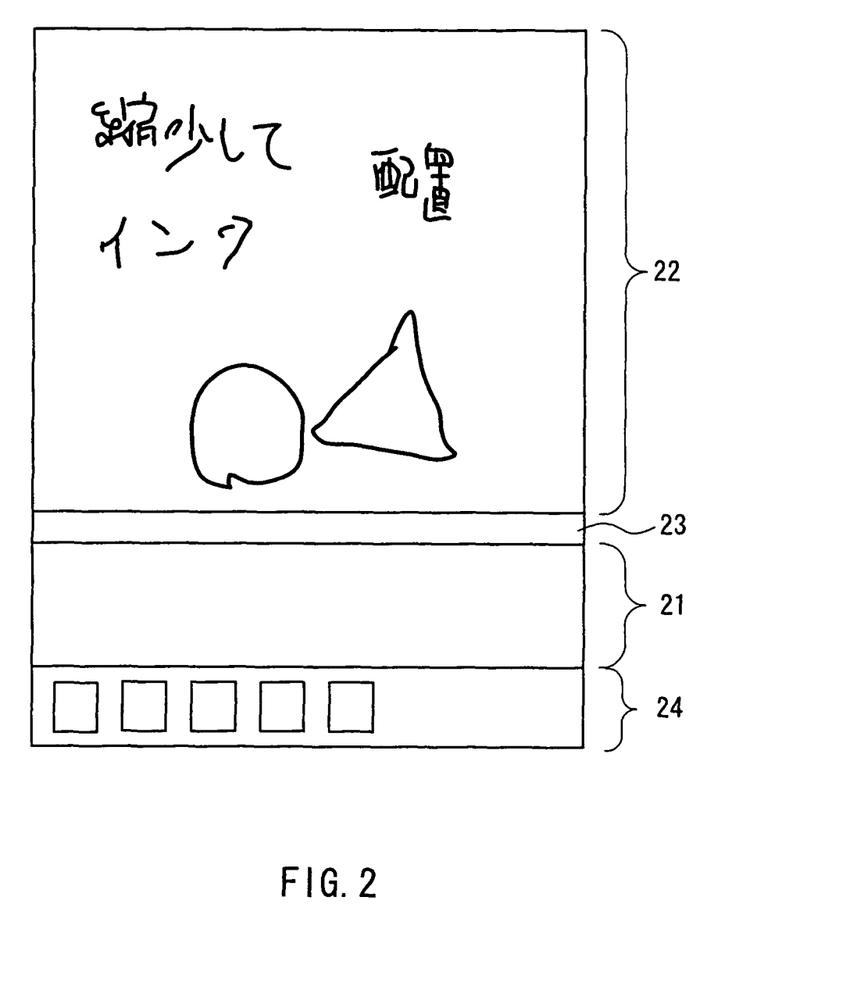
FIG. 2 is a view illustrating a screen configuration in an example using the handwriting-input device according to the embodiment of the present invention.

Next, an example in which the handwriting-input device according to the present embodiment is incorporated in a portable terminal will be described. FIG. 2 is a view illustrating a screen configuration in the example using the handwriting-input device according to the embodiment of the present invention.

As shown in FIG. 2, a screen configuration is roughly classified into the normalized pencraft input area 21 and the pencraft arrangement area 22, and a horizontal scroll area 23 that also functions as a screen ratio changing bar is present at a boundary therebetween. Furthermore, reference numeral 24 denotes an operation menu area in which an operation menu such as an erasure button and the like for switching between a write mode and an erasure mode is arranged.

Figure 3A:
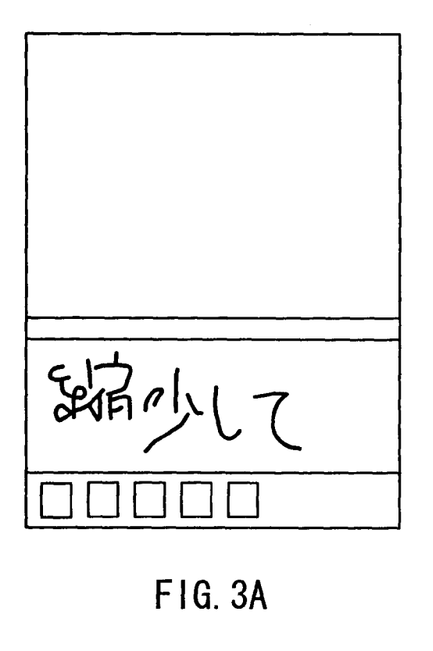
FIGS. 3A to 3C are views illustrating a pencraft input operation in the example using the handwriting-input device according to the embodiment of the present invention.
Figure 3B:
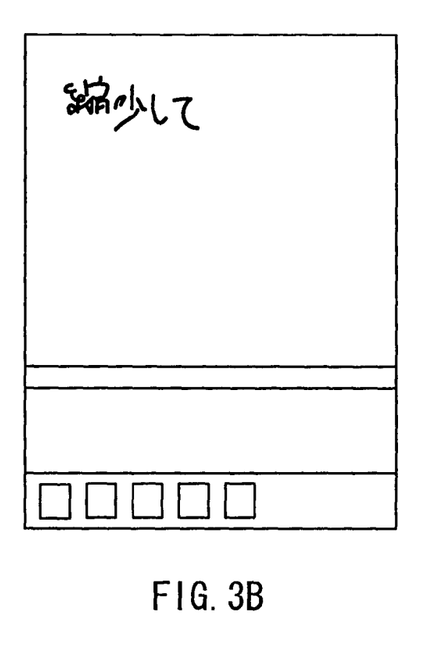

FIGS. 3A to 3C are views illustrating a handwritten character input operation in the example using the handwriting-input device according to the present example. First, as shown in FIG. 3A, handwritten characters "縮小して" are written in the normalized pencraft input area 21. Then, the position in the pencraft arrangement area 22, at which the handwritten characters are desired to be arranged, is tapped with a pen or the like, whereby the handwritten characters are reduced in size in accordance with a set normalization procedure to be arranged and displayed at the tapped position, as shown in FIG. 3B. There is no particular limit to the means to normalize, and any known method may be used.

Figure 3C:
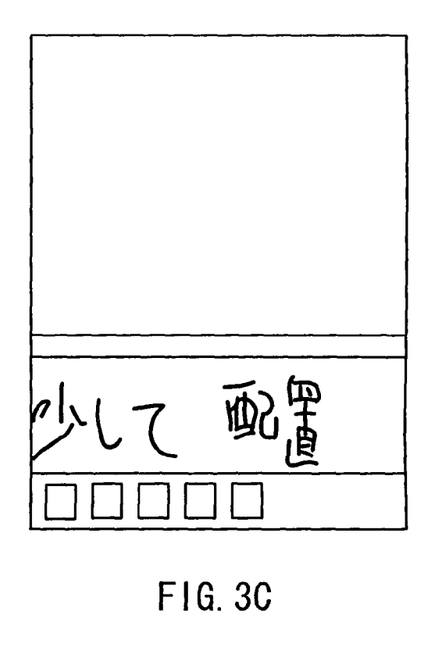

It is also considered that the input of handwritten characters may be long handwritten characters such as "縮小して配置". In order to address such a case, as shown in FIG. 3C, the horizontal scroll area 23 is slid leftward by dragging to move the currently displayed pencrafts leftward, whereby an unwritten portion in the normalized pencraft input area 21 can be displayed on a screen. More specifically, the displayed pencrafts are also moved in the same direction as the dragged direction of the horizontal scroll area 23. Thus, even a long sentence can be input easily as handwritten characters.

Furthermore, in the case where a character is desired to be written with a large size in the normalized pencraft input area 21, for example, in the case where it is desired to write a complicated Chinese character with a number of strokes, etc., the horizontal scroll area 23 is dragged upward, whereby the width of the normalized pencraft input area can also be enlarged.

In this case, under the condition that the width of the normalized pencraft input area 21 remains enlarged, the pencraft arrangement area 22 is relatively narrow at a time of arranging the handwritten characters, so that the degree of freedom in arrangement is lost. Thus, in the pencraft arrangement means 6, it is also determined whether or not the pencraft arrangement area 22 is smaller than a predetermined area, and in the case where the pencraft arrangement area 22 is smaller than the predetermined area, i.e., in the case where the horizontal scroll area 23 is shifted upward exceeding an upper limit, the pencraft arrangement area 22 is enlarged to a predetermined size so that a pencraft can be easily arranged. According to this configuration, even in the case where a pencraft desired to be normalized can be input with a large size at a time of an input, the pencraft can be arranged without a physical constraint at a time of arrangement.

It is desired that a prescribed value of the size of the pencraft arrangement area 22 is previously set to be an appropriate value, and it is more desirable that a set screen is prepared so that it can be updated in accordance with the preference of a user.

Figure 4:
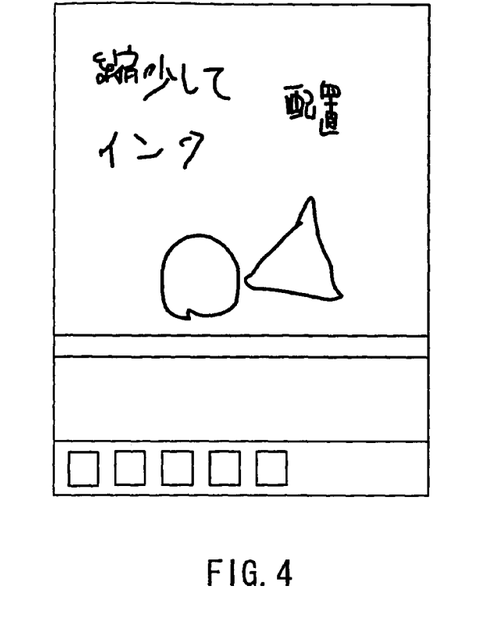
FIG. 4 is a view illustrating the pencraft input operation in the example using the handwriting-input device according to the embodiment of the present invention.

Next, FIG. 4 is a view illustrating an operation of inputting a pencraft that is not required to be normalized in the example using the handwriting-input device according to the present example. Generally, in most cases, a graphic is not required to be normalized, and an input pencraft thereof only needs to be displayed as it is.

As shown in FIG. 4, in the case of inputting a pencraft such as a graphic that is not required to be normalized, the pencraft can be input directly in the pencraft arrangement area 22. At this time, in the handwriting-input device, the above-mentioned pencraft-not-requiring-normalization input processing is performed, and the processing result is displayed by the display means 4.

A method for inputting a handwritten graphic is not limited to that shown in FIG. 4, and it is desired to input a normalized graphic in some cases. In such a case, for example, the following method may be used. A handwritten graphic is input in the normalized pencraft input area 21, and arranged in the pencraft arrangement area 22 by a pen operation. In this case, the input handwritten graphic with its size subjected to normalization such as reduction is displayed. On the other hand, the case where a handwritten character is not desired to be normalized to be input is considered. Also in this case, a handwritten character only needs to be written directly in the pencraft arrangement area 22 in a similar manner to that of the input of a handwritten graphic.

Figure 5:
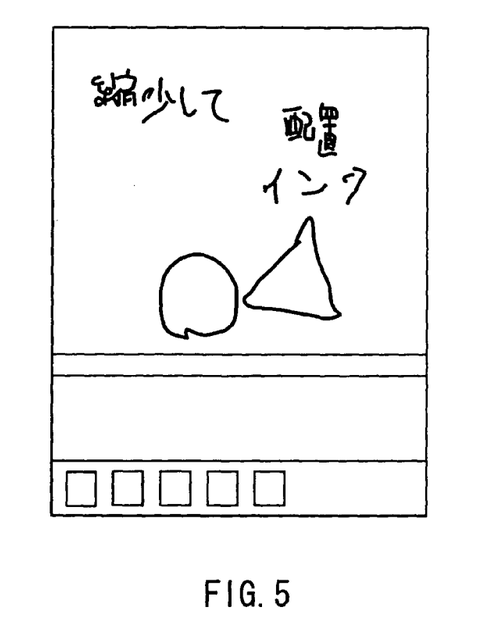
FIG. 5 is a view illustrating a pencraft rearrangement operation in the example using the handwriting-input device according to the embodiment of the present invention.

FIG. 5 is a view illustrating a rearrangement operation of a pencraft in the example using the handwriting-input device according to the present example. FIG. 5 shows a state in which handwritten characters "インク" that have already been arranged in FIG. 4 are tapped with an input medium such as a pen, and moved by dragging to an arbitrary position. More specifically, a handwritten character or a handwritten graphic in the pencraft arrangement area 22 is tapped with a pen or the like, and dragged as it is, whereby the arrangement of the pencraft can be changed freely.

More specifically, a plurality of pencrafts input continuously are managed as a collection of stroke data, and when an inner area of a circumscribed rectangle with respect to the collection of stroke data is tapped, the collection of stroke data becomes a target for movement. The inner area of the circumscribed rectangle can be specified with an upper left coordinate of the circumscribed rectangle being a start position and a lower right coordinate being an end position.

Figure 6A:
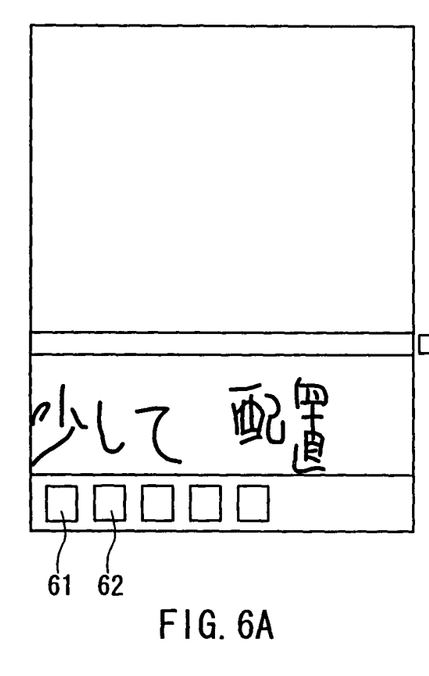
FIGS. 6A to 6C are views illustrating a pencraft correction operation in the example using the handwriting-input device according to the embodiment of the present invention.
Figure 6B:
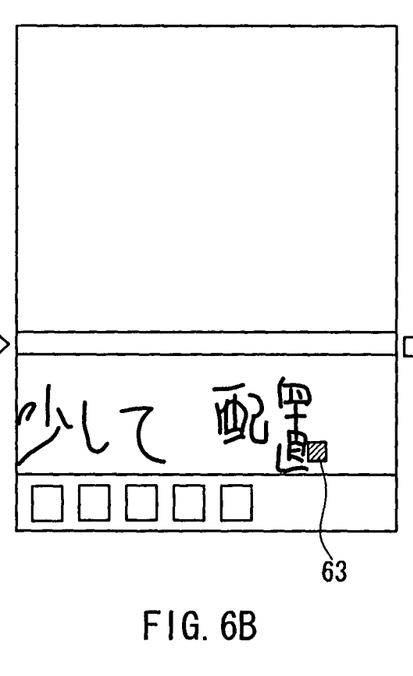
Figure 6C:
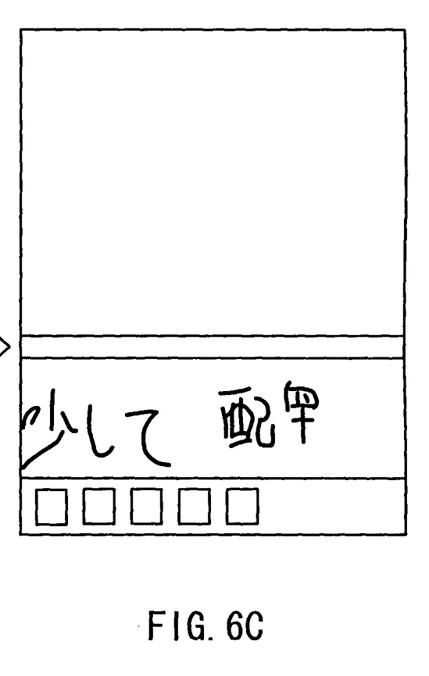

Next, the following case is also considered. In the case where a pencraft is input in the normalized pencraft input area 21, the content thereof is desired to be corrected before being arranged in the pencraft arrangement area 22 due to the mistake of an input operation itself of the pencraft. FIGS. 6A to 6C are views illustrating a correction operation of a pencraft in the example using the handwriting-input device according to the present example.

First, in FIG. 6A, in the case where a pencraft is corrected in the normalized pencraft input area 21, an erasure button 61 for switching to an erasure mode is selected so as to erase a mistaken portion. The erasure button 61 is placed in the operation menu area 24.

Then, in the erasure mode, as shown in FIG. 6B, when the normalized pencraft input area 21 is tapped with a pen or the like, an eraser icon 63 is displayed. By moving the eraser icon 63 on the normalized pencraft input area 21, stroke data or bit map data in a portion where the eraser icon 63 has passed is erased as shown in FIG. 6C.

Needless to say, the method for erasing a pencraft is not limited to the method for erasing only a portion where the eraser icon 63 has passed. For example, stroke data, even a part of which the eraser icon 63 has passed, may be erased as a whole. A pencraft desired to be erased may be surrounded by a handwritten closed mark such as "○", "□", or the like.

Furthermore, as the method for converting an erasure mode to an ordinary input mode, a method for selecting an input button 62 for resetting the erasure mode may be used. Alternatively, a method in which the erasure mode automatically returns to the input mode at a time of an initial pen-up in the erasure mode may be used.

In the case of using the input button, a pencraft can be erased continuously. However, unless the erasure mode is reset, the erasure mode cannot be shifted to an input of a pencraft. On the other hand, in the case of using a method for automatically returning to the input mode, although a plurality of portions of a pencraft cannot be erased continuously, an ordinary input operation can be performed immediately.

Figure 7A:
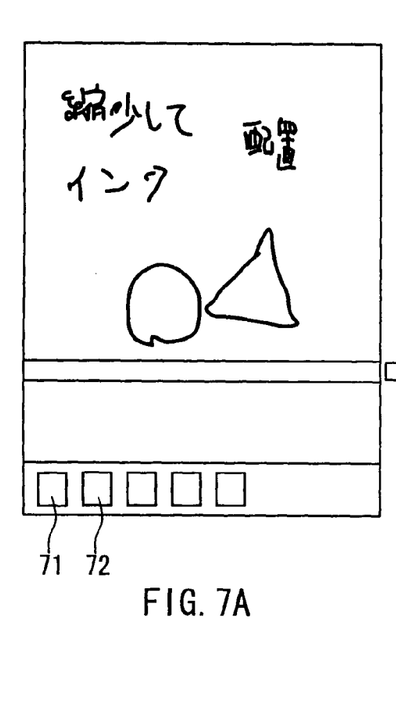
FIGS. 7A to 7C are views illustrating a pencraft correction operation in the example using the handwriting-input device according to the embodiment of the present invention.
Figure 7B:
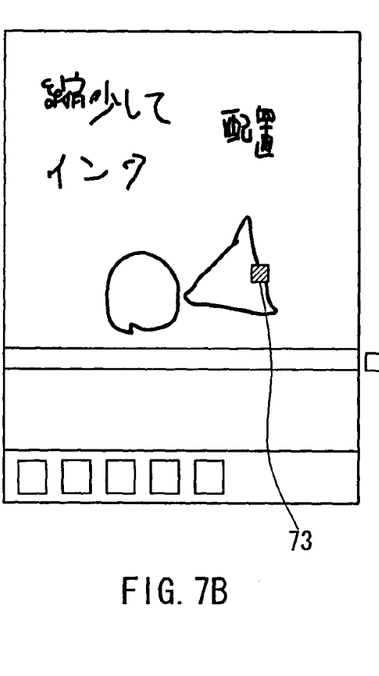
Figure 7C:
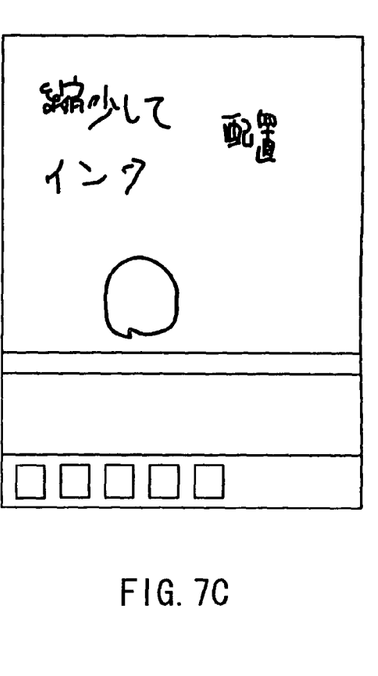

Next, the case where, after a pencraft is arranged in the pencraft arrangement area 22, the content thereof is corrected, is also considered. FIGS. 7A to 7C are views illustrating a correction operation of a pencraft in the example using the handwriting-input device according to the present example.

Even in FIG. 7A, in the same way as in FIG. 6A, an erasure button 71 for switching to the erasure mode for erasing a mistaken portion is selected. The erasure button 71 is placed in the operation menu area 24.

In the erasure mode, as shown in FIG. 7B, when the pencraft arrangement area 22 is tapped with a pen or the like, an erasure icon 73 is displayed, and the erasure icon 73 is moved on the pencraft arrangement area 22, whereby stroke data or bit map data in a portion where the erasure icon 73 has passed is erased as shown in FIG. 7C.

Needless to say, the method for erasing a pencraft is not limited to a method for erasing only a portion where the eraser icon 73 has passed. For example, stroke data, even a part of which the eraser icon 73 has passed, may be erased as a whole. A pencraft desired to be erased may be surrounded by a handwritten closed mark such as "○", "□", or the like.

Furthermore, as the method for converting an erasure mode to an ordinary input mode, a method for selecting an input button 72 for resetting the erasure mode may be used. Alternatively, a method in which the erasure mode automatically returns to the input mode at a time of an initial pen-up in the erasure mode may be used.

Figure 8:
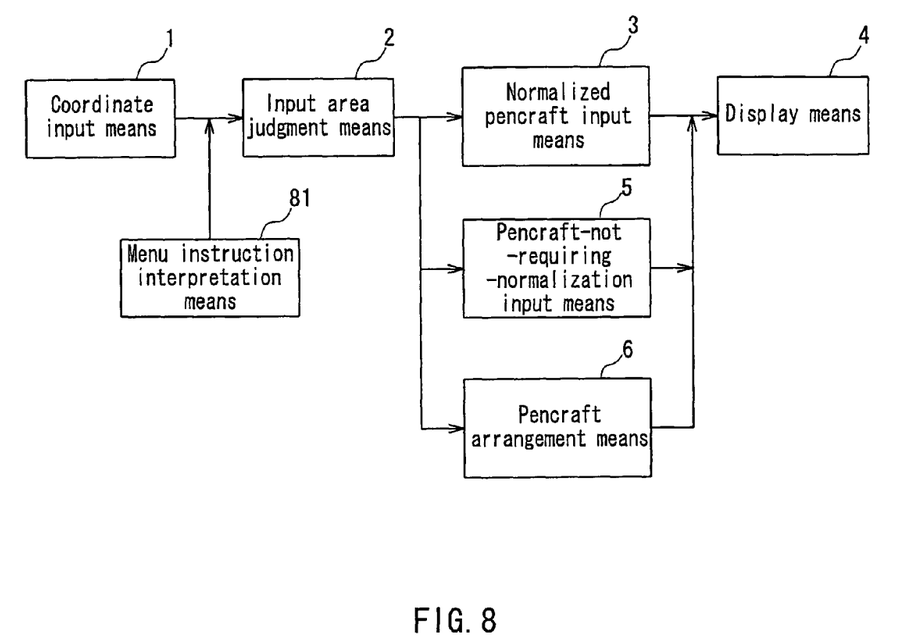
FIG. 8 is a diagram showing another configuration of the handwriting-input device according to the embodiment of the present invention.

Since an operation of switching between the input mode and the erasure mode is required, the configuration of a portion of a portable terminal according to the present example corresponding to a handwriting-input device is as shown in FIG. 8. In FIG. 8, menu instruction interpretation means 81 is newly provided, whereby whether or not an instruction for entering the erasure mode is given is determined.

More specifically, in the menu instruction interpretation means 81, it is determined which of the erasure button 61(71) and the input button 62(72) is pressed finally, i.e., whether a signal transmitted finally is an erasure mode switching signal or an input mode switching signal, and display/non-display of the erasure icon 63(73) is controlled in accordance with the determination result.

In the case where it is desired to perform reedition such as the addition to a pencraft that has already been arranged in the pencraft arrangement area 22, the pencraft displayed in the pencraft arrangement area 22 is tapped, and immediately thereafter, the normalized pencraft input area 21 is tapped, whereby a stroke data group of the selected pencraft is transferred to the normalized pencraft input area 21 to be able to be edited.

As the operation of data transfer, in addition to a tap operation, a method for moving a pencraft to be reedited to the normalized pencraft input area 21 by a drag operation, or the like is also considered.

Furthermore, when a normalized pencraft is moved to the normalized pencraft input area 21, it is required to return the pencraft to a state before being normalized. However, in the case where the pencraft is reduced in size by normalization, even when the stroke data of the pencraft reduced in size is enlarged, the pencraft cannot return to an original state. Thus, by saving the stroke data of a pencraft in an original state and the stroke data after normalization in pairs, in the case where the normalized pencraft is moved to the normalized pencraft input area 21, the pencraft can return exactly to that before being normalized.

Figure 9:
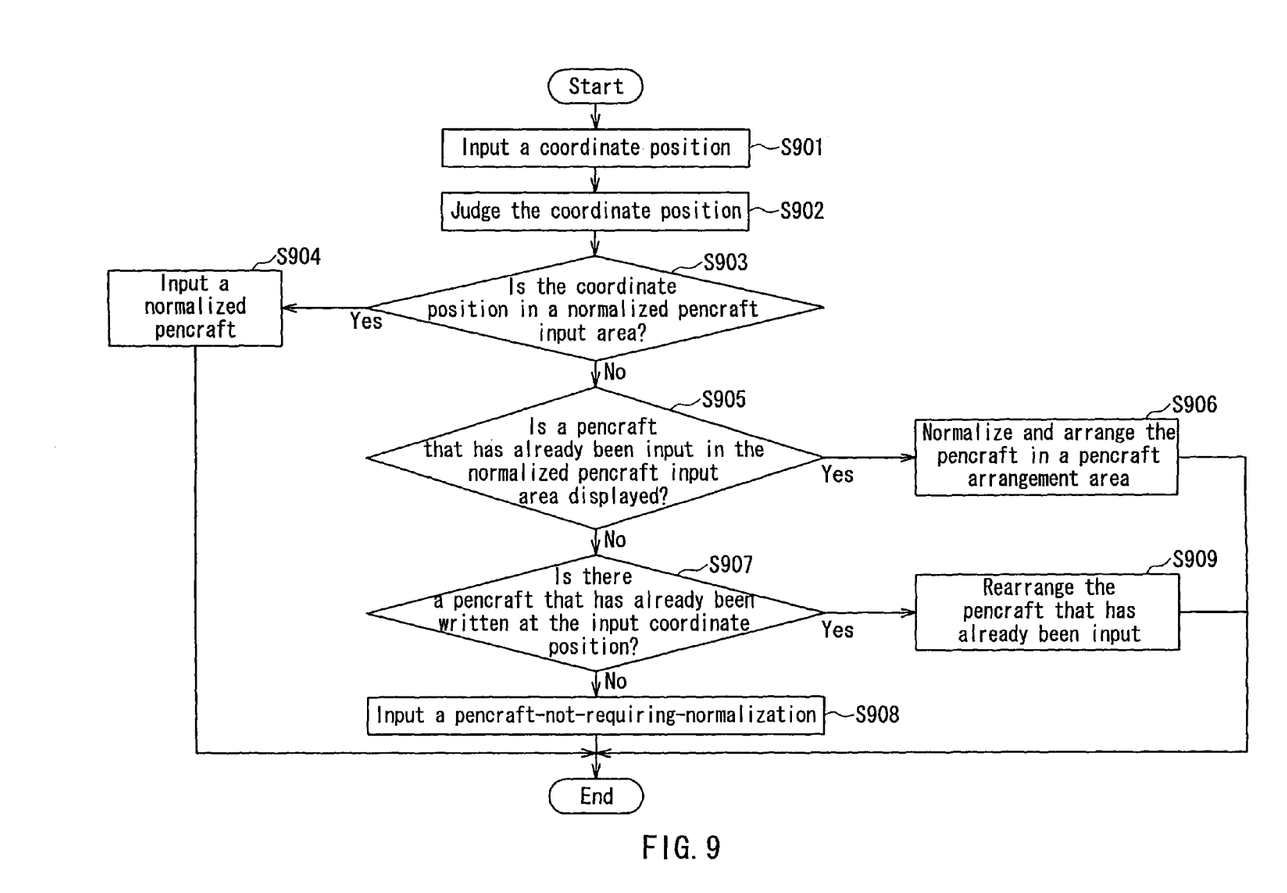
FIG. 9 is a flowchart illustrating the processing in the handwriting-input device according to the embodiment of the present invention.

Next, the processing flow of a program for realizing the handwriting-input device according to the embodiment of the present invention will be described. FIG. 9 shows a flowchart of the processing of the program for realizing the handwriting-input device according to the embodiment of the present invention.

In FIG. 9, first, in a screen display area in which a user can input a pencraft, a coordinate of a position at which an input medium such as a pen taps is input (Step S901). Then, it is judged which area of the above-mentioned normalized pencraft input area 21 and the pencraft arrangement area 22 the input coordinate position corresponds to, and the like (Step S902).

Then, in the case where the coordinate position is in the normalized pencraft input area 21 (Step S903: Yes), it is judged that an input operation of a pencraft desired to be normalized is to be performed, and a pencraft is input in the normalized pencraft input area 21 (Step S904). Furthermore, in the case where the coordinate position is in the pencraft arrangement area 22 (Step S903: No), it is determined whether or not the pencraft input in the normalized pencraft input area 21 is displayed (Step S905).

In the case where the pencraft input in the normalized pencraft input area 21 is displayed (Step S905: Yes), it is judged that an operation of arranging the input pencraft in the pencraft arrangement area 22 is to be performed, and the pencraft displayed in the normalized pencraft input area 21 is normalized to a predetermined size to be arranged in the pencraft arrangement area 22 (Step S906).

In the case where the pencraft input in the normalized pencraft input area 21 is not displayed (Step S905: No), it is determined whether or not there is a pencraft that has already been input at the input coordinate position (Step S907). In the case where there is no pencraft that has already been arranged at the input coordinate position (Step S907: No), it is judged that an operation of inputting a pencraft that is not required to be newly normalized is to be performed, and a pencraft that is not required to be normalized is input (Step S908).

In the case where there is a pencraft that has already been arranged at the input coordinate position (Step S907: Yes), it is judged that an operation of rearranging the pencraft that has already been arranged in the pencraft arrangement area 22 is to be performed, and the pencraft that has already been arranged is moved to a desired position (Step S909).

As described above, according to the present embodiment, whether a pencraft desired to be normalized is input or a pencraft desired to be input as it is without being normalized is input can be controlled in accordance with the operation situation of an input medium such as a pen. Thus, a handwriting-input can be performed in accordance with the intention of a user without requiring the user to consciously switch between a normalized pencraft input mode and a non-normalized pencraft input mode.

Furthermore, even in the case where a display screen itself is narrow, and a resolution is low, as in the case of using a portable terminal or the like, the input area of a pencraft can be kept large. Even in the case where a pencraft input by being normalized is large, an easy-to-see input result can be displayed.

Figure 10:
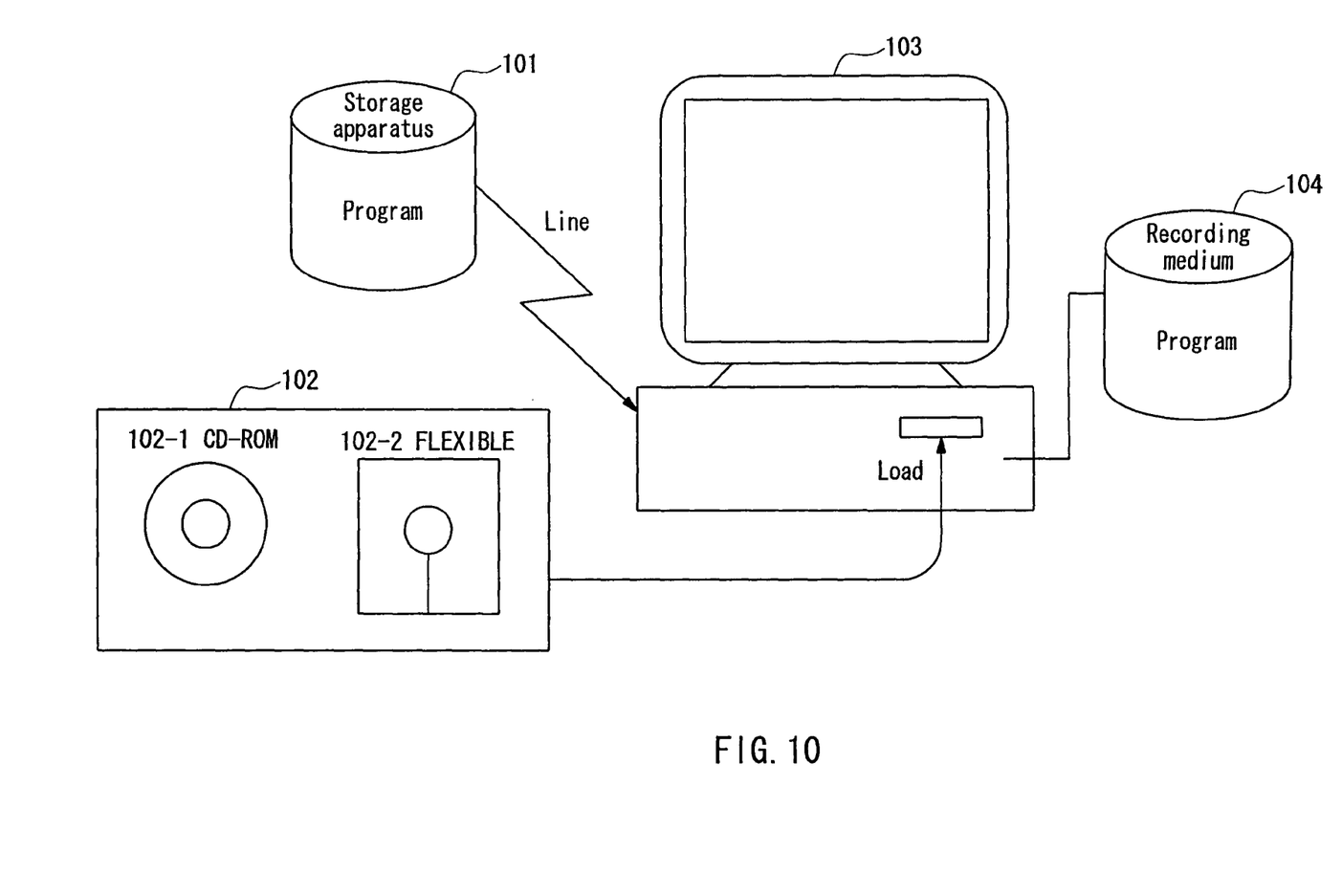
FIG. 10 is a view illustrating a computer environment.

A program for realizing the handwriting-input device according to the embodiment of the present invention may be stored not only in a portable recording medium 102 such as a CD-ROM 102-1, a flexible disk 102-2, or the like, but also in another storage apparatus 101 provided at the end of a communication line and a recording medium 104 such as a hard disk, a RAM, or the like of a computer 103, as shown in FIG. 10. During execution, the program is loaded to be executed on a main memory.

INDUSTRIAL APPLICABILITY

As described above, according to the handwriting-input device of the present invention, whether a pencraft desired to be normalized is input or a pencraft desired to be input as it is without being normalized is input can be controlled in accordance with the operation situation of an input medium such as a pen. Thus, a handwriting-input can be performed in accordance with the intention of a user without requiring the user to consciously switch between a normalized pencraft input mode and a non-normalized pencraft input mode.

Furthermore, according to the handwriting-input device of the present invention, even in the case where a display screen itself is narrow, and a resolution is low as in the case of using a portable terminal or the like, the input area of a pencraft can be kept large, and even in the case where a pencraft input by being normalized is large, an easy-to-see input result can be displayed.

The invention claimed is:

1. A handwriting-input device comprising:
   an input unit;
   a display screen on which a normalized pencraft input area for inputting and displaying a pencraft that is to be reduced in size and a pencraft arrangement area for inputting and displaying a pencraft are displayed as separate areas from each other;
   a coordinate input part to obtain coordinate position information on a pencraft input by the input unit; and
   an input area judgment part to judge which of the normalized pencraft input area and the pencraft arrangement area the pencraft is to be input in, based on the coordinate position information,
   wherein, based on a judgment result by the input area judgment part,
   once it is judged that the pencraft is input in the normalized pencraft input area by the input unit, the input pencraft is displayed on the normalized pencraft input area,
   once it is judged that the pencraft is input in the pencraft arrangement area by the input unit, the pencraft is not input in the normalized pencraft input area, and there is no pencraft that has already been input at an input position of the pencraft in the pencraft arrangement area, the input pencraft is displayed so as to exactly preserve a shape of the pencraft in the pencraft arrangement area,
   once it is judged that a first coordinate position of the pencraft as input by the input unit is included in the pencraft arrangement area, and there is a pencraft or a pencraft group that has already been input in the normalized pencraft input area, the pencraft or the pencraft group present in the normalized pencraft input area is reduced in size, so as to exactly preserve a shape of the pencraft or the pencraft group, and displayed at the first coordinate position of the pencraft as input in the pencraft arrangement area, and
   once it is judged that the first coordinate position of the pencraft to be input by the input unit is included in the pencraft arrangement area, there is no pencraft that has already been input in the normalized pencraft input area and a pencraft or a pencraft group has already been input at the first coordinate position of the input pencraft, the pencraft or the pencraft group that has already been input is rearranged in the pencraft arrangement area.

2. The handwriting-input device according to claim 1, wherein the coordinate input part to obtain continuous coordinate position information due to a drag operation of the input unit, the input area judgment part to detect a coordinate position corresponding to a start position of the drag operation and a coordinate position corresponding to an end position thereof, and to judge which of the normalized pencraft input area and the pencraft arrangement area the coordinate position corresponding to the start position and the coordinate position corresponding to the end position are respectively present in, and based on a judgment result by the input area judgment part, the pencraft present at the coordinate position corresponding to the start position is to move to the coordinate position corresponding to the end position.

3. The handwriting-input device according to claim 2, wherein an area ratio between the normalized pencraft input area and the pencraft arrangement area is specified, and a display area ratio between the normalized pencraft input area and the pencraft arrangement area is varied depending upon the specified area ratio.

4. The handwriting-input device according to claim 2, wherein a horizontal scroll area is provided between the normalized pencraft input area and the pencraft arrangement area, and the normalized pencraft input area is configured to be enlarged or reduced in size by the horizontal scroll area.

5. The handwriting-input device according to claim 1, wherein an area ratio between the normalized pencraft input area and the pencraft arrangement area is specified, and a display area ratio between the normalized pencraft input area and the pencraft arrangement area is varied depending upon the specified area ratio.

6. The handwriting-input device according to claim 1, wherein a horizontal scroll area is provided between the normalized pencraft input area and the pencraft arrangement area, and the normalized pencraft input area can be enlarged or reduced in size by the horizontal scroll area.

7. A handwriting-input method using a handwriting input device that includes an input unit and a display screen, the method comprising:

allowing the display screen to display a normalized pencraft input area for inputting and displaying a pencraft that is to be reduced in size and a pencraft arrangement area for inputting and displaying a pencraft as separate areas from each other;

obtaining coordinate position information on a pencraft input by the input unit; and performing in accordance with a first coordinate position of the pencraft to be input by the input unit and an input situation of the pencraft in the respective normalized pencraft input area and the pencraft arrangement area such that:

(1) upon it being judged that the pencraft is input in the normalized pencraft input area by the input unit, the input pencraft is displayed on the normalized pencraft input area;

(2) upon it being judged that the pencraft is input in the pencraft arrangement area by the input unit, the pencraft is not input in the normalized pencraft input area, and there is no pencraft that has already been input at an input position of the pencraft in the pencraft arrangement area, the input pencraft is displayed so as to exactly preserve a shape of the pencraft in the pencraft arrangement area;

(3) upon it being judged that the first coordinate position of the pencraft as input by the input unit is included in the pencraft arrangement area and there is a pencraft or a pencraft group that has already been input in the normalized pencraft input area, the pencraft or the pencraft group present in the normalized pencraft input area is reduced in size, so as to exactly preserve a shape of the pencraft or the pencraft group, and displayed at the first coordinate position of the pencraft as input in the pencraft arrangement area, and (4) upon it being judged that the first coordinate position of the pencraft to be input by the input unit is included in the pencraft arrangement area, there is no pencraft that has already been input in the normalized pencraft input area, and a pencraft or a pencraft group has already been input at the first coordinate position of the input pencraft, the pencraft or the pencraft group that has already been input is rearranged in the pencraft arrangement area.

8. A non-transitory recording medium storing a program for allowing a computer processor to execute a handwriting-input method using a handwriting input device that includes an input unit and a display screen, the method comprising:

allowing the display screen to display a normalized pencraft input area for inputting and displaying a pencraft that is to be reduced in size and a pencraft arrangement area for inputting and displaying a pencraft as separate areas from each other;

obtaining coordinate position information on a pencraft input by the input unit; and performing in accordance with a first coordinate position of the pencraft to be input by the input unit and an input situation of the pencraft in the respective normalized pencraft input area and the pencraft arrangement area such that:

(1) once it is judged that the pencraft is input in the normalized pencraft input area by the input unit, the input pencraft is displayed on the normalized pencraft input area;

(2) once it is judged that the pencraft is input in the pencraft arrangement area by the input unit, the pencraft is not input in the normalized pencraft input area, and there is no pencraft that has already been input at an input position of the pencraft in the pencraft arrangement area, the input pencraft is displayed so as to exactly preserve a shape of the pencraft in the pencraft arrangement area;

(3) once it is judged that the first coordinate position of the pencraft to be input by the input unit is included in the pencraft arrangement area and there is a pencraft or a pencraft group that has already been input in the normalized pencraft input area, the pencraft or the pencraft group present in the normalized pencraft input area is reduced in size, so as to exactly preserve a shape of the pencraft or the pencraft group, and displayed at the first coordinate position of the pencraft as input in the pencraft arrangement area, and (4) once it is judged that the first coordinate position of the pencraft to be input by the input unit is included in the pencraft arrangement area, there is no pencraft that has already been input in the normalized pencraft input area, and a pencraft or a pencraft group has already been input at the first coordinate position of the input pencraft, the pencraft or the pencraft group that has already been input is rearranged in the pencraft arrangement area.

* * * * *